(No Model.)

C. CHALLINER.
TIRE FOR WHEELS.

No. 467,769. Patented Jan. 26, 1892.

Witnesses.
E. B. Bolton
E. K. Sturtevant

INVENTOR.
Charles Challiner.
By his Att'ys
Richards & Co.

THE NORRIS PETERS CO., PHOTO-LITHO., WASHINGTON, D. C.

UNITED STATES PATENT OFFICE.

CHARLES CHALLINER, OF MANCHESTER, ENGLAND.

TIRE FOR WHEELS.

SPECIFICATION forming part of Letters Patent No. 467,769, dated January 26, 1892.

Application filed February 26, 1891. Serial No. 382,961. (No model.) Patented in England November 25, 1889, No. 18,941; in Belgium September 27, 1890, No. 92,127, and in France September 27, 1890, No. 208,493.

*To all whom it may concern:*

Be it known that I, CHARLES CHALLINER, manager, a subject of the Queen of Great Britain and Ireland, residing at 15 Plymouth Avenue, Longsight, Manchester, in the county of Lancaster, England, have invented an Improvement in Tires for Wheels, (for which I have obtained Letters Patent in England No. 18,941, dated November 25, 1889; in Belgium No. 92,127, dated September 27, 1890, and in France No. 208,493, dated September 27, 1890,) of which the following is a specification.

This invention is designed principally for adapting noiseless tires to the wheels of railway-platform luggage-wagons, barrows, trolleys, and similar vehicles; but the invention is also applicable to the wheels of carriages used upon common roads.

I make the rubber of the size and form (or nearly so) which it is intended to assume when in the grooved tire, and I vulcanize to the base thereof a steel or other suitable metal ring, segment, or strip. The base of the elastic rubber tire is thus made unyielding and non-elastic, so that it cannot be easily twisted out of the groove when in use.

To render my said invention perfectly clear, I will now describe the same with reference to the annexed sheet of drawings.

Figure 1:
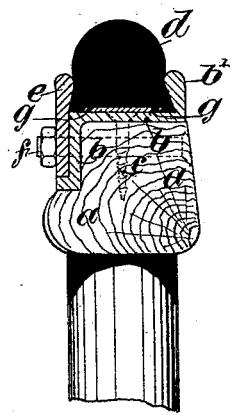
Figure 2:
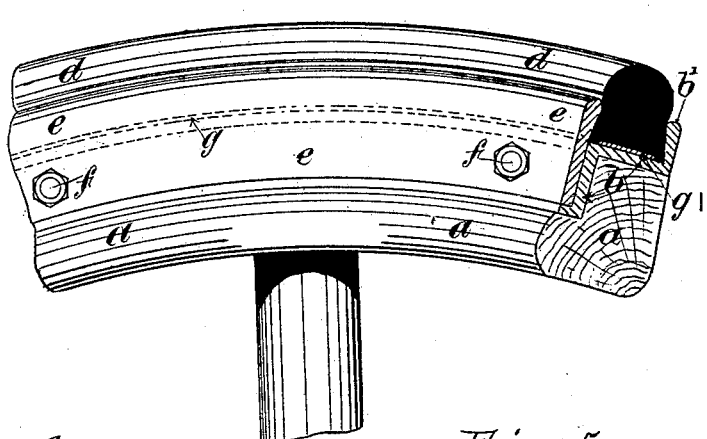
Figure 4:
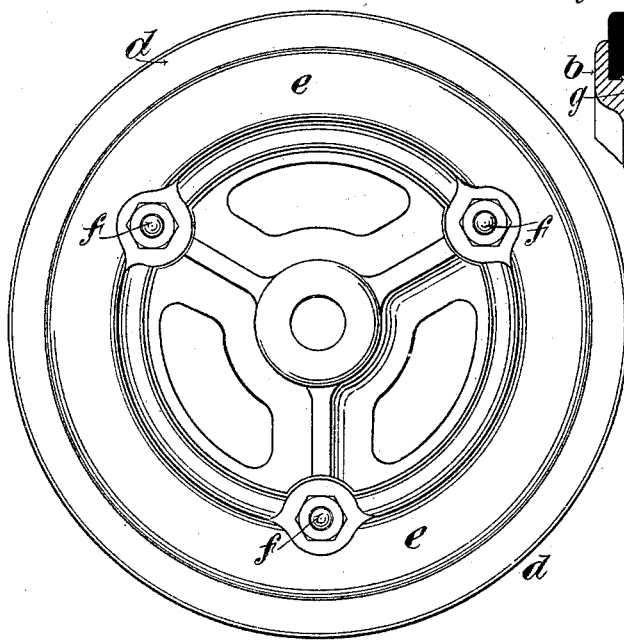
Figures 5, 6:
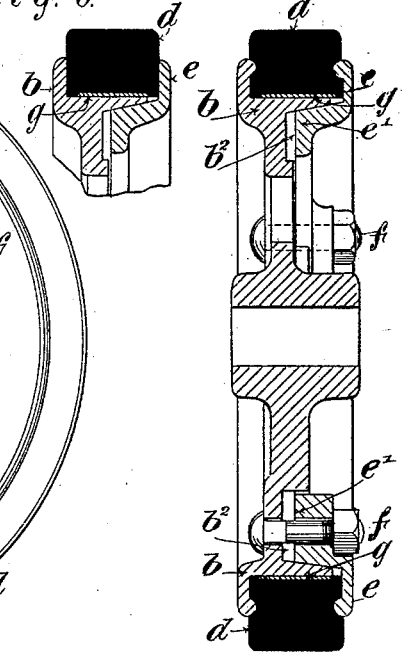
Figure 3:
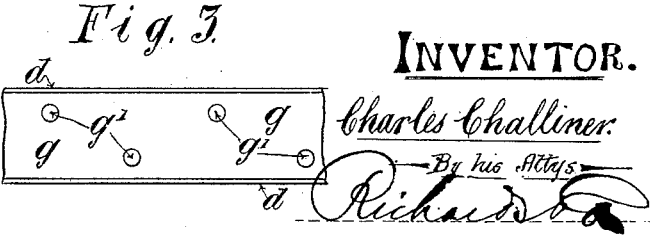

Figure 1 of the said drawings is a cross-section of a carriage-wheel felly, to which my invention is shown applied. Fig. 2 is a side view of a portion of the said felly. Fig. 3 is a plan view of the rubber tire and metal base vulcanized thereto, showing the perforations to assist in uniting the base to the rubber. Fig. 4 is a side view of a trolley-wheel suitable for use on railway-platforms and in other situations where a noiseless wheel of the indicated nature is desirable. Fig. 5 is a cross-section of Fig. 4. Fig. 6 is a sectional view of a slight modification.

Referring first of all to Figs. 1 to 3 of the drawings, I fit the carriage-wheel felly $a$ with a metal ring $b$, the sectional form of which is clearly shown in Fig. 1. This ring $b$ is shrunk on and riveted or screwed to the felly $a$—as, for example, by means of screws $c$. (Shown in dotted lines in Fig. 1.) The shrinking on of the ring $b$ binds the wheel firmly together. It will be seen that the portion $b'$ of the ring $b$ forms one side of the trough-shaped annular recess which contains and confines the base of the rubber tire $d$. The other side of the recess is constituted by the separate and removable ring $e$, which is clamped to the side of the ring $b$ by bolts $f$, which pass through the felly and through the side flange of the ring $b$. The ring $b$ and the ring $e$, when thus put together, form an annular recess having overhanging sides, as clearly shown in the drawings.

The rubber tire $d$ of the sectional form shown in the drawings may form one complete ring, or it may be formed of segments, and it has vulcanized to its inner circumference or base a metallic ring $g$. The rubber tire $d$ may be made of the sectional form shown in the drawings or of a form approximately thereto, or it may be made with perfectly straight sides afterward pinched or compressed into the form shown in the drawings by the application and screwing up of the bolt on side ring $e$. To assist in securing the rubber tire $d$ to the metallic base-ring $g$, I form the said base-ring with countersunk holes $g'$. (Indicated in Fig. 3.) Before vulcanization the rubber of the tire is squeezed through these holes, thus forming, as it were, rubber rivets, which after and in conjunction with the vulcanizing process unite the rubber tire and the base-ring in an extremely secure manner. By the addition of this metallic base-ring $g$ to the rubber tire $d$ and the uniting of the two homogeneously in the manner described, I obtain a rubber tire with a very rigid, strong, and unyielding base, which effectually prevents any possibility of the tire being worked out of its annular trough or recess. This rigid base prevents the rubber from stretching and becoming loose when running, and also prevents the rubber when partly worn from buckling or becoming hollow or concave at the base.

By means of my improvements I am enabled to hold the rubber tire in position without putting so excessive a pinching and compressing strain upon the sides, as has hitherto been the case with rubber tires inserted or forced into V or other undercut section-rings by means of powerful machines. The consequence is that a rubber tire fitted in accordance with my invention retains its nature and elasticity for a much longer time.

Another advantage gained from my construction is that when the rubber tire has to be renewed it is not necessary to send the whole wheel to the factory, for by loosening the bolts and removing the side ring $e$ the rubber tire and its metallic base can be easily removed and a fresh rubber tire mounted upon and vulcanized to the old base-ring. The said base-ring $g$ is made somewhat less in width than the width of the bottom of the annular groove, so that the rubber when vulcanized thereto projects slightly over the base-ring. The effect of this is that when the base is compressed by the side ring $e$ the rubber folds down over the edge of the base-ring and thus interposes a rubber cushion between the edges of the base-ring and the sides of the annular trough.

The rubber tire and the base-ring might both be continuous and unbroken, or they might either or both be divided at a point or at points in their circumference.

Figs. 4 and 5 show a modification of my invention as applied to the construction of railway-platform trolley-wheels. Except in minor details, there is no departure from the principle of this invention, as described, with reference to the foregoing figures, and similar parts are designated by similar letters. The trolley-wheel, which is of cast metal, is composed of two portions—viz., the part $b$, comprising the rim, arms, and central boss, and the ring $e$, which is bolted to the side of $b$ by the bolts $f$. It will be seen that by thus bolting the two parts $b$ and $e$ together an annular groove is formed, having inwardly-projecting or overhanging beads, in which groove is confined the rubber tire $d$, which is vulcanized upon the steel base-ring $g$, precisely as in the case of the foregoing figures. To assist in steadying the ring $e$ upon the wheel $b$ and to relieve the bolts $f$ from the strain, I form an annular recess $b^2$, with inclined side or sides, which admits a correspondingly-shaped annular projection $e'$ from the ring $e$. The two parts of the wheel are thus knit together and mutually support each other.

Instead of forming the two sides composing the groove to hold the rubber tire with inwardly-projecting beads, as shown in the drawings, I might make them of a V-hook or other undercut section, which would tend to grip or hold the rubber when the side ring is applied, or I might make the groove with perfectly straight sides, as shown in Fig. 6.

What I claim is—

1. In a wheel, in combination with a suitable felly, a ring $b$, secured to and placed upon the periphery of said felly and having an upwardly-extending flange, a removable ring $e$, secured to the felly, and a rubber tire having a rigid metallic base secured upon said felly between the flange and ring and resting upon the part of the ring $b$ which rests upon the periphery of the felly.

2. In a wheel, in combination with a suitable felly, a ring, as $g$, secured thereto, said ring having downwardly and upwardly extending flanges $b\ b'$, respectively, a ring, as $e$, removably attached to the felly, and a tire having a rigid metallic base and secured between the flange $b'$ and ring $e$, substantially as described.

3. In a wheel, in combination with a suitable felly, a ring secured thereto having upwardly and downwardly extending flanges, a second ring, as $e$, also secured to the felly and parallel with the upwardly-turned flange $b'$, said ring $e$ and flange $b'$ having beads upon their interior sides, and a rubber tire secured between said ring and flange, substantially as described.

4. In a wheel, in combination with a suitable felly, a ring, as $g$, secured to the rim of the wheel and having upwardly and downwardly turned flanges $b\ b'$, a ring $e$, and a bolt $f$, passing through the ring $e$, flange $b$, and felly, and a rubber tire secured between the flange $b'$ and ring $e$, substantially as described.

5. In a wheel, in combination with a felly, a suitable flange extending upwardly from said felly between which the tire is secured, said tire being composed of rubber and having a rigid metallic base having countersunk holes $g'$, said tire having integral rubber rivets forced through the holes $g'$.

In witness whereof I have hereunto set my hand in presence of two witnesses.

CHARLES CHALLINER.

Witnesses:
 JOSHUA ENTWISLE,
 RICHARD IBBERSON.